Feb. 14, 1961    J. W. BAUM    2,972,051
POCKET RADIATION DOSIMETER
Filed July 16, 1958
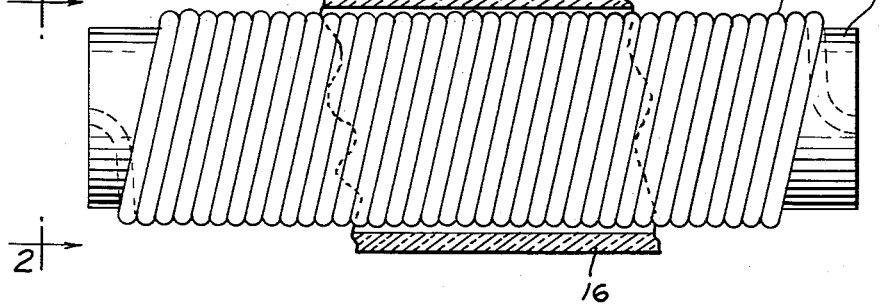
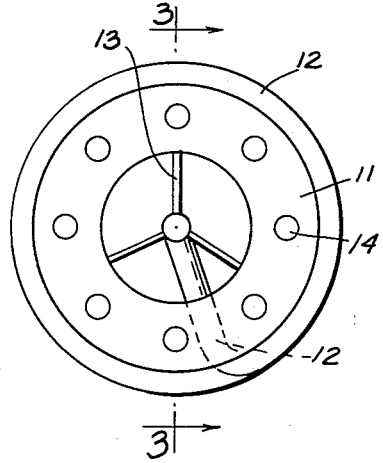
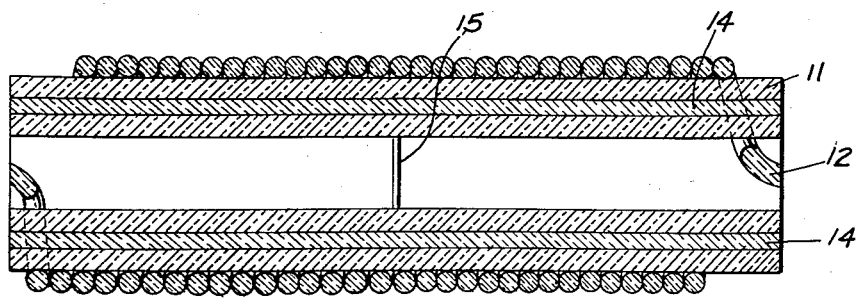
INVENTOR.
JOHN W. BAUM

United States Patent Office 2,972,051
Patented Feb. 14, 1961

2,972,051
POCKET RADIATION DOSIMETER
John W. Baum, Chicago, Ill., assignor to Armour Research Foundation of Illinois Institute of Technology, Chicago, Ill., a corporation of Illinois
Filed July 16, 1958, Ser. No. 748,958
5 Claims. (Cl. 250—83)

The instant invention relates to a device for readily measuring ionizing radiation dosage, and more particularly relates to such device wherein circularly wound transparent fibers or rods, or the like, formed of radiation sensitive materials are employed as the radiation responsive element.

Coloration of, or light transmission effects upon glass, plastics or various selected organic liquids, is a recognized method of measuring radiation dosage and the dosimeter hereindescribed and claimed makes use of such phenomena. The impingement of radiation upon such materials results in an alteration of their light absorption property as a function of the quantity of radiation, and by comparing the light absorption or transmission before and after exposure it is feasible to measure the radiation dose. In the past small panes or blocks of radiation sensitive glasses or plastics have been employed as the operative dosimeter element, but such dosimeters, while operative within certain limits, have proven somewhat insensitive both in the determination of small amounts of radiation and in the discrimination between varying increments of ionizing effects. By the use of comparatively long, circularly wound, radiation sensitive fibers or rods an improved dosimeter, as taught in the instant specification, is obtained, and such dosimeter is extremely sensitive to small dosages of ionizing radiation, or comparatively small increasing increments thereof.

In view of the foregoing, a primary object of my invention is to provide a rugged, conveniently carried device for measuring nuclear radiation dosage which device is several orders of magnitude more sensitive than presently known similar dosimeters.

Another object of my invention is to provide a sensitive radiation dosimeter which may be readily carried on the person and which employs a simple, direct read-out technique.

A more specific object of my invention is to provide a radiation dosimeter, the detection element of which consists of a circularly wound, radiation-sensitive transparent member.

Other objects, features and advantages of my invention will become apparent to those skilled in this particular art from the following detailed disclosure thereof and the accompanying drawings in which:

Figure 1 is a side view of a dosimeter produced in accord herewith.

Figure 2 is a view taken along line 2—2 of Figure 1; and

Figure 3 is a sectional view taken across line 3—3 of Figure 2.

With the development of the industrial uses of nuclear energy and the continued widespread research therein the need has arisen for simple, sensitive and quickly read portable radiation dosimeters, and particularly those dosimeters which may be readily carried about or on the person. It is also, I think, evident that such dosimeters which have immediate application in the field of industrial nuclear energy operations may also find use for civil defense and military purposes. It is to such dosimeters that my invention is primarily directed.

For many years it has been known that various specialized glasses are sensitive to ionizing radiation—i.e., in some instances their light transmission properties or color will become altered when subjected to such radiation. It is also known that various selected plastics and organic liquids also exhibit such reaction phenomena and in the past these likewise have been used in one form or another in radiation dosimetry. With such knowledge at hand many attempts have been made to utilize such phenomena for radiation detection purposes, but to the best of my knowledge to date such devices have either been so cumbersome or complex that they fail to meet the need for portability and quick read-out, or on the other hand, have lacked the sensitivity that is required to accurately measure radiation dosage received by a person from his environment.

More specifically, the art discloses that two major types of portable radiation dosimeters have been utilized to date. In one, a photographic badge is worn by the person and as the film in such badge is acted upon by the ionizing radiations the film becomes exposed and at some later date the amount of radiation having struck such film is determined. On the other hand, another type of radiation dosimeter, as mentioned before, has utilized small blocks or plates of radiation sensitive glass or plastic. Upon being struck by the ionizing radiation the transmission efficiency or color of the glass is altered and such change may be readily calibrated to total radiation impingement dose. This specification is not meant to detract from the latter devices for most certainly by their use a rapid, if perhaps somewhat qualitative, measure of ionizing radiation is obtained, but unfortunately these have lacked the sensitivity oftentimes desired to most adequately measure dosage. The photographic device may be considerably more sensitive than mine but because of the film development requirement lacks the simple, rapid read-out technique.

My main purpose in developing the instant invention is to provide a device which utilizes as the radiation sensitive element a glass or plastic material in the form of a fiber bundle, rod, or hollow cylinder in which an organic radiation sensitive material is encased. By extending and elongating the sensor and thus increasing the effective volume by which the radiation dosage is measured devices of extraordinary sensitivity are provided. The structure of the present devices, as exemplified by the attached drawings, will become more apparent to those skilled in this art when considered in conjunction with such drawings.

Referring now to the drawings:

Figure 1 discloses a mandril 11 about which is circularly wound a radiation sensitive glass fiber bundle 12. It should be understood that such bundle may be replaced with a flexible glass rod, or a plastic rod or fibers, or a glass cylinder in which a radiation sensitive organic liquid such as chloroform is entrained. The mandril may either be a solid core, depending upon the read-out technique that is used, or it may be most simply a hollow cylinder, formed of a rigid substance. The fiber bundle extends from one extremity of the mandril to other and at such ends thereof is centrally positioned therein, as shown in the drawings.

In Figure 2 is seen one feasible means of centrally suspending the fiber bundle at either end of the mandril 11. This is readily accomplished by attaching said bundle end to the mandril by wires 13 or the like.

Figure 2 also discloses one feasible read-out apparatus as positioned at the left end of Figure 1. Circumferentially positioned about the mandril is noted the bundle 12. Annularly positioned within the walls of the mandril are rods 14 formed of glasses of various controlled light transmission efficiencies, such rods being the standard with which to compare the light transmission through the bundle 12 when radioactive dosage read-out is desired. Such rods are more clearly shown in Figure 3 as extending throughout the length of the mandril. These rods vary inter se by small increments of percentage transmission; that is to say that rod number 1 will have for example 100% transmission, rod number 2, 90%, rod number 3, 80% and so forth. These are the standards.

In Figure 3 is shown a positive light stop member 15 for use with a hollow mandril. Such opaque member is necessary with the use of a hollow mandril to prevent light leakage which may result from incomplete internal reflection at the input end of rod 12.

Surrounding the instant device is a housing member 16. Such housing should be formed of a material which is transparent to the nuclear radiations measured by the instant device and may either only annularly surround the rod encased mandril from intermediate the ends thereof or may completely surround it. In the former instance the housing would not have to be removed to read the device, whereas in the latter such removal would be necessary.

It is also required in the instant invention that the rods 14 be encased within a light-opaque material and thus either the mandril must be an opaque solid or if a hollow cylinder the walls thereof must be opaque to light.

The actual operation of the device is comparatively simple. When ionizing radiation impinges upon the glass or plastic fiber bundle 12, the light transmission thereof is altered and such effects vary as a direct function of the amount of radiation. For purposes of example we may assume that the unradiated bundle has a transmission efficiency of 100%. Upon being struck by excess amount of radiation its transmission efficiency may drop to 90% and therefore either its color or transmission, or both, is modified accordingly. After such impingement the device is held up to a source of light as for example that from a flashlight, and the light rays are permitted to pass through the bundle and standard rods. The user need only compare the color or transmission of the bundle 12 with that of the annularly positioned standards to determine the amount of radiation to which the bundle and the user of the device have been subjected.

It should of course be understood that various other read-out techniques may be utilized, as for example a "gray wedge" type read-out could be readily employed for field use. This utilizes a disc with segments of varying opacity. Numbers are imprinted on each segment which numbers correspond to the largest dose a person could possibly have received and yet have sufficient light transmission to make the number visible. Such disc rotates from a low reading to a higher reading in front of the end of bundle 12 until a number becomes visible thereon, this number provides the reading for the particular dosage which has impinged upon the rod.

In order that there will be no misunderstanding, the present radiation dosimeter may be used for high energy ionizing radiation as for example X-ray, gamma rays, neutrons, cosmic rays, beta rays, and in some instances alpha particles.

In the preferred embodiment of our invention the bundle 12 is composed of glass fibers which possess flexibility and which may be readily circularly wound about the mandril 11. Such fiber bundle should have a cross-section of approximately at least ¼ of an inch in order that the light transmission therethrough may be readily measured. Such radiation sensitive glasses are well known, but for example may either be a silver activated phosphate glass or a cobalt glass, both of which are extremely sensitive to ionizing radiation. The silver activated glass has the following composition:

| | Percent by weight |
|---|---|
| $Al(PO_3)_3$ | 50 |
| $Ba(PO_3)_2$ | 21 |
| $KPO_3$ | 21 |
| $AgPO_3$ | 8 |

The cobalt glass has the following composition:

| | Percent by weight |
|---|---|
| $SiO_2$ | 62.5 |
| $Na_2O$ | 10.6 |
| $B_2O_3$ | 20.8 |
| $Al_2O_3$ | 6.0 |
| $Co_3O_4$ | 0.1 |

In order to make use of the internal reflection of the bundles of glass fibers it is necessary that light leakage be held to a minimum. To this end it is preferable to wind the glass bundle about the mandril at such an angle that bends or kinks in the bundle are avoided and that the bundle assume a smooth, mild angular arc or contour. This is what is meant by circularly wound.

The reference rods are formed of glass which is extremely radiation resistant as for example many groups of lead containing glasses of which the following is but one example:

| | Percent |
|---|---|
| $SiO_2$ | 45.6 |
| $PbO$ | 43.1 |
| $Na_2O$ | 4.7 |
| $K_2O$ | 6.1 |
| $As_2O_3$ | 0.5 |

In the foregoing example weight percentages are used. Such standards in most instances are formed of one particular radiation resistant glass having controlled increments of transmission efficiency. Thus they are most prevalently formed of glasses having no particularly different extreme colors but possessed of different shades of the same colors.

It will be understood that modifications and variations may be effected without departing from the spirit or scope of the novel concepts of the instant invention.

I claim as my invention:

1. A radiation dosimeter comprising in combination: a light opaque mandril, a radiation sensitive member spirally wound about such mandril, and a light transmission comparator positioned at one end of said mandril.

2. A radiation dosimeter comprising in combination: a mandril, a radiation sensitive member spirally wound about said mandril, and means to compare the light transmission through said spirally wound member before and after its subjection to ionizing radiation.

3. A radiation dosimeter comprising in combination: a mandril, a radiation sensitive glass rod spirally wound about said mandril, and means to compare the light transmission efficiency of said radiation sensitive glass rod before and after its being subjected to ionizing radiation.

4. A radiation dosimeter comprising in combination: a mandril, a radiation sensitive bundle of glass fibers spirally wound about said mandril, and means to compare the light transmission through said radiation sensitive fiber bundle before and after its subjection to ionizing radiation.

5. The radiation dosimeter as defined in claim 2 wherein said radiation sensitive member comprises a transparent cylinder in which is entrapped a radiation sensitive organic liquid.

References Cited in the file of this patent

UNITED STATES PATENTS

| 2,442,823 | Polye | June 8, 1948 |
| 2,673,934 | Friedman | Mar. 30, 1954 |
| 2,750,515 | Shurcliff | June 12, 1956 |
| 2,752,506 | Fitzgerald et al. | June 26, 1956 |
| 2,781,714 | Schulman et al. | Apr. 2, 1957 |
| 2,867,792 | Peters | Jan. 6, 1959 |